US006663063B2

(12) United States Patent
Tatta

(10) Patent No.: US 6,663,063 B2
(45) Date of Patent: Dec. 16, 2003

(54) DEVICE AND METHOD FOR SUPPORTING AN ELECTRONIC TOLL PASS ASSEMBLY AGAINST THE WINDSHIELD OF A VEHICLE

(76) Inventor: Andrew Tatta, 341 Rockland Rd., Wayne, PA (US) 19087

(*) Notice: Subject to any disclaimer, the term of this patent is extended or adjusted under 35 U.S.C. 154(b) by 0 days.

(21) Appl. No.: 10/098,725

(22) Filed: Mar. 18, 2002

(65) Prior Publication Data

US 2003/0173481 A1 Sep. 18, 2003

(51) Int. Cl.[7] .................................................. F16B 47/00

(52) U.S. Cl. ............... 248/205.3; 248/208; 248/220.22; 248/915; 40/593; 40/594

(58) Field of Search ........................... 248/205.3, 205.5, 248/208, 220.22, 314, 311.2, 309.1, 316.2, 915, 467, 476; 340/693.6; 40/593, 594, 643, 644

(56) References Cited

U.S. PATENT DOCUMENTS

| | | | | | |
|---|---|---|---|---|---|
| 2,093,598 | A | * | 9/1937 | Clark | 40/661.09 |
| 3,241,795 | A | * | 3/1966 | Frye | 248/205.5 |
| 3,313,053 | A | * | 4/1967 | Vobeli, Sr. | 40/593 |
| 3,533,178 | A | * | 10/1970 | Strohmaier | 40/593 |
| 3,885,768 | A | * | 5/1975 | Frye | 248/549 |
| 4,003,538 | A | * | 1/1977 | Frye | 248/544 |
| 4,184,276 | A | * | 1/1980 | Hernandez | 40/593 |
| 4,605,292 | A | * | 8/1986 | McIntosh | 248/205.3 |
| 4,648,572 | A | * | 3/1987 | Sokol | 248/205.2 |
| 4,671,480 | A | * | 6/1987 | Frye | 248/205.3 |
| 4,756,498 | A | * | 7/1988 | Frye | 248/205.3 |
| 4,836,482 | A | * | 6/1989 | Sokol | 248/206.3 |
| 4,848,542 | A | * | 7/1989 | Burnette et al. | 206/765 |
| 4,864,755 | A | * | 9/1989 | Owens | 40/594 |
| 4,896,855 | A | * | 1/1990 | Furnish | 248/206.3 |
| 4,989,819 | A | * | 2/1991 | Sigler | 248/476 |
| 5,016,850 | A | * | 5/1991 | Plahn | 248/206.3 |
| 5,069,376 | A | * | 12/1991 | Barel | 224/277 |
| 5,131,177 | A | * | 7/1992 | Sy, Jr. | 40/591 |
| 5,241,768 | A | * | 9/1993 | Thompson | 40/593 |
| 5,275,367 | A | * | 1/1994 | Frye | 248/205.3 |
| 5,310,999 | A | * | 5/1994 | Claus et al. | 235/384 |
| 5,502,912 | A | * | 4/1996 | LeBoff et al. | 40/593 |
| 5,678,793 | A | * | 10/1997 | Hill | 224/482 |
| 5,960,572 | A | * | 10/1999 | DeVito | 248/206.2 |
| 6,127,938 | A | * | 10/2000 | Friedman | 206/720 |
| 6,142,640 | A | * | 11/2000 | Schofield | 359/838 |
| 6,390,429 | B1 | * | 5/2002 | Brincat | 224/420 |
| 6,446,374 | B1 | * | 9/2002 | Ardiff | 40/593 |
| 6,452,507 | B1 | * | 9/2002 | Friedman | 248/352 |
| 2003/0066224 | A1 | * | 4/2003 | Sumner et al. | 40/593 |
| 2003/0079392 | A1 | * | 5/2003 | Newman | 40/661 |

* cited by examiner

*Primary Examiner*—Kimberly Wood
*Assistant Examiner*—Naschica S. Morrison
(74) *Attorney, Agent, or Firm*—LaMorte & Associates

(57) ABSTRACT

A mounting device and method for mounting an electronic toll payment pass to the interior of a vehicle's windshield. The device is comprised of a mounting structure having a face surface and a back surface. The face surface of the mounting structure is attached to the glass of the vehicle's windshield. The electronic toll payment pass is connected to the back surface of the mounting structure in a manner that allows the electronic toll payment pass to be easily installed and removed by the driver of the vehicle. When the electronic toll payment pass is attached to the mounting structure, the mounting structure is interposed between the glass of the windshield and the electronic toll payment pass. The mounting structure preferably contains a display image. The display image is visible through the glass of the windshield and obstructs the viewing of the electronic toll payment pass.

4 Claims, 5 Drawing Sheets

DEVICE AND METHOD FOR SUPPORTING AN ELECTRONIC TOLL PASS ASSEMBLY AGAINST THE WINDSHIELD OF A VEHICLE

BACKGROUND OF THE INVENTION

1. Field of the Invention

The present invention relates to electronic toll payment passes that are used to automatically pay a toll as a vehicle passes through a tollbooth. More particularly, the present invention relates to devices and methods that are used to mount electronic toll payment passes against the windshield of a vehicle so it can be read at a tollbooth.

2. Prior Art Statement

In the past, when a vehicle passed through a tollbooth, the driver of the vehicle had to stop the vehicle and pay a toll. This disrupts the regular flow of traffic. If heavy traffic is present on the toll road, it is not uncommon for large traffic backups to exist approaching a toll plaza, as each vehicle prepares to stop and pay the toll. In attempts to better increase traffic flow, different traffic authorities have tried many different ways to decrease the amount of time a vehicle spends stopped at a tollbooth. If the amount of time per vehicle can be decreased, the traffic congestion can likewise be decreased.

One way to decrease the amount of time a vehicle spends at a tollbooth is to install coin toss buckets in some of the tollbooths. Coin toss buckets are commonly used on toll roads that have small tolls. Coin toss buckets enable a driver of a vehicle to pay a toll simply by throwing the money for the toll into a collection bucket that quickly counts the money to determine if the proper toll has been paid. However, if a toll is in excess of one dollar, coin toss buckets become impractical since few people carry enough coins to pay the toll. Many traffic authorities have also tried coupon books. Coupon books are bought by the driver of a vehicle. Each coupon in the book is good for one passage through the toll. As such, a toll collector need only collect the coupon without having to receive money and make change. The time savings with the use of coupons is nominal. Accordingly, the use of coupons does not have a significant effect on traffic patterns at tollbooths.

Electronic toll payment passes are the first true solution to reducing traffic congestion problems at tollbooths. Electronic toll payment passes are electronic transceivers that contain a coded customer number. Owners of vehicles open credit accounts and receive an electronic toll payment pass with a unique customer identification code. The electronic toll payment pass is mounted against the inside of a vehicle's windshield. When the vehicle passes through a tool booth, the electronic toll payment pass is automatically activated, wherein the electronic toll payment pass transmits its customer code. A receiver within the tollbooth reads the transmitted customer code and debits the price of the toll against the account having that customer code.

Since the use of electronic toll payment passes consists of nothing more than the exchange of electronic data, vehicles having electronic toll payment passes do not have to stop. They need only pass through the tollbooth. For the sake of safety, however, many tollbooths place speed limits on how fast a vehicle with an electronic toll payment pass can pass through the tollbooth without stopping.

Typically, electronic toll payment passes are provided with two strips of hook and loop material that adhesively mount to the windshield of the vehicle. The housing of the electronic toll payment pass also has two strips of hook and loop material that can be selectively joined to the hook and loop strips on the windshield. This retains the electronic toll payment pass in place against the windshield, yet provides the ability to quickly remove the device from the windshield when the vehicle is left unattended.

There are certain disadvantages to electronic toll payment passes. When an electronic toll payment pass is mounted onto the interior of a windshield, the base of the electronic toll payment pass is visible through the glass of the windshield. This enables thieves to quickly determine if an electronic toll payment pass has been left within a vehicle. The visibility of the electronic toll payment pass also detracts from the aesthetic value of the vehicle.

In the prior art, there have been devices that are designed to hold electronic toll payment passes in place. These prior art devices typically consist of some type of bracket that holds the electronic payment pass against the back of a vehicle's sun visor. As such, the sun visor must be lowered each time the vehicle passes through a tollbooth, in order to bring the electronic toll payment pass within close proximity of the windshield. With many makes of vehicles, the sun visor does not turn flush with the interior of the windshield. In such model vehicles, the electronic toll payment pass cannot be mounted to the sun visor because it may not be properly positioned to operate in a tollbooth.

A need therefore exists for a system and method of retaining an electronic toll payment pass in place against the interior of a windshield in a manner that both prevents the electronic toll payment pass from being readily seen and does not detract from the aesthetic appeal of the vehicle.

SUMMARY OF THE INVENTION

The present invention is a mounting device and method for mounting an electronic toll payment pass to the interior of a vehicle's windshield. The device is comprised of a mounting structure having a face surface and a back surface. The face surface of the mounting structure is attached to the glass of the vehicle's windshield with either adhesive or double-sided tape. The electronic toll payment pass is connected to the back surface of the mounting structure in a manner that allows the electronic toll payment pass to be easily installed and removed by the driver of the vehicle.

When the electronic toll payment pass is attached to the mounting structure, the mounting structure is interposed between the glass of the windshield and the electronic toll payment pass. The mounting structure preferably contains a display image. The display image is visible through the glass of the windshield and obstructs the viewing of the electronic toll payment pass through the windshield. Consequently, when the mounting structure is in place, the presence or absence of the electronic toll payment pass cannot be readily determined by an observer outside the vehicle. Furthermore, when the electronic toll payment pass is present, the uninteresting appearance of the electronic toll payment pass is replaced with a selected aesthetically pleasing display image.

BRIEF DESCRIPTION OF THE DRAWINGS

For a better understanding of the present invention, reference is made to the following descriptions of exemplary embodiments thereof, considered in conjunction with the accompanying drawings, in which.

DETAILED DESCRIPTION OF THE DRAWINGS

Although the present invention mounting device and method can be adapted for use with any electronic toll payment system, the illustrations show the present invention mounting shaped to receive the rectangular housing of the EZ Pass(TM) brand of electronic toll payment passes. Such a configuration is merely exemplary and it should be understood that different brand electronic toll payment passes are made with other housing shapes. The configuration of the present invention mounting device can be changed to accommodate those housing shapes.

Figure 1:
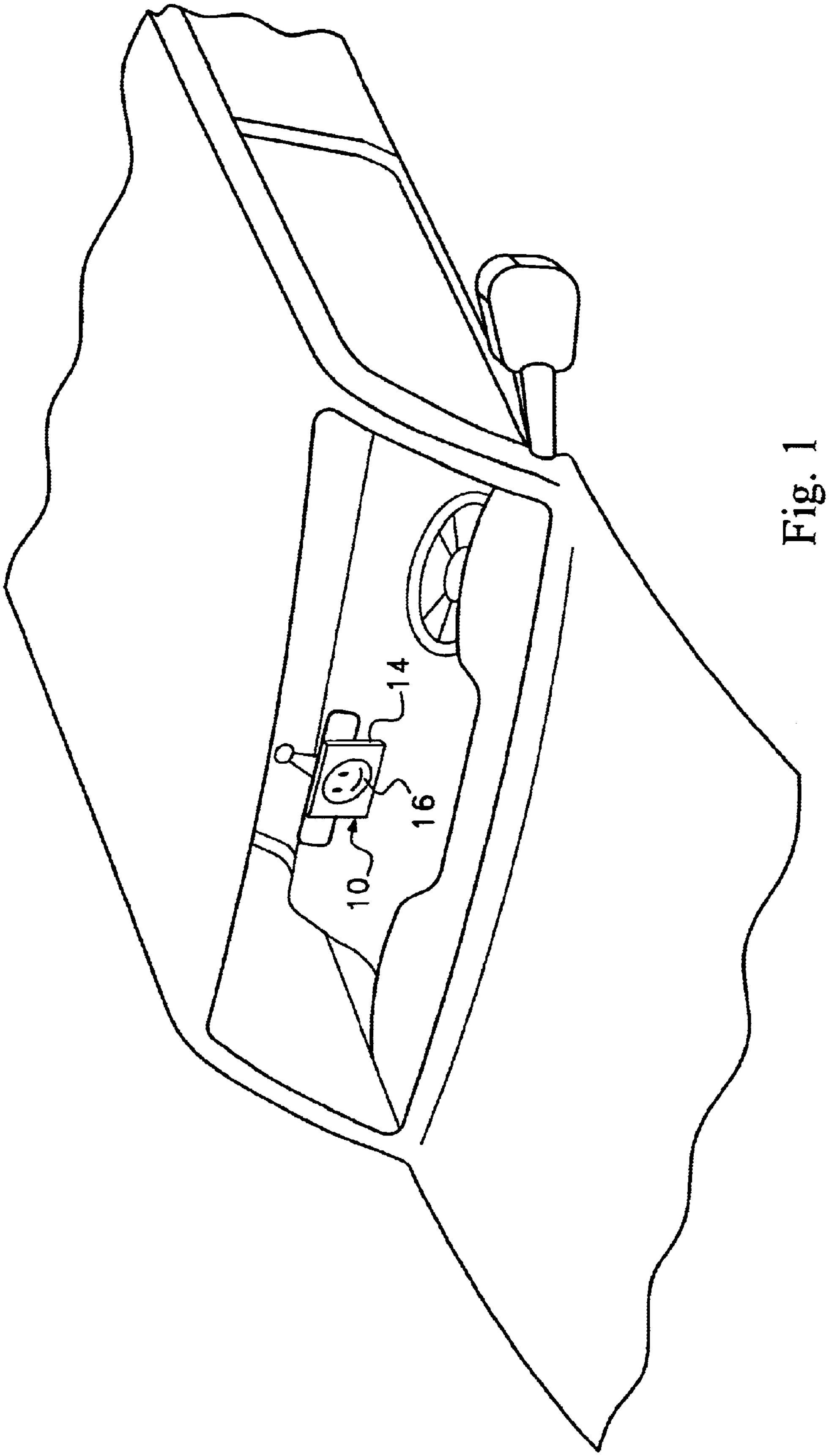
FIG. 1 is perspective view of the windshield of a vehicle against which the present invention mounting device is installed.

Referring to FIG. 1, an exemplary embodiment of the present invention mounting device 10 is shown applied to the windshield 12 of an automobile. The mounting device 10 can be mounted to any point on the interior of the windshield 12 where an electronic toll payment pass 14 is to be held. However, it is recommended that most electronic toll payment passes 14 be mounted onto the interior of the windshield 12 either above or behind the mounting of the rearview mirror. As such, the present invention mounting device 10 is shown mounted to the windshield 12 at such a recommended point.

The present invention mounting device 10 engages and retains an electronic toll payment pass 14. However, the mounting device 10 is opaque and presents a display image 16 towards the glass of the windshield 12. In this manner, a person looking at the windshield 12 cannot tell if the electronic toll payment pass 14 is in place. Furthermore, even if the electronic toll payment pass 14 is in place, it cannot be seen. Only the display image 16 is seen. In this manner a display image 16 can be selected that compliments the aesthetics of the vehicle. As will later be explained, the display image 16 can be either a set image or an interchangeable image.

Figure 2:
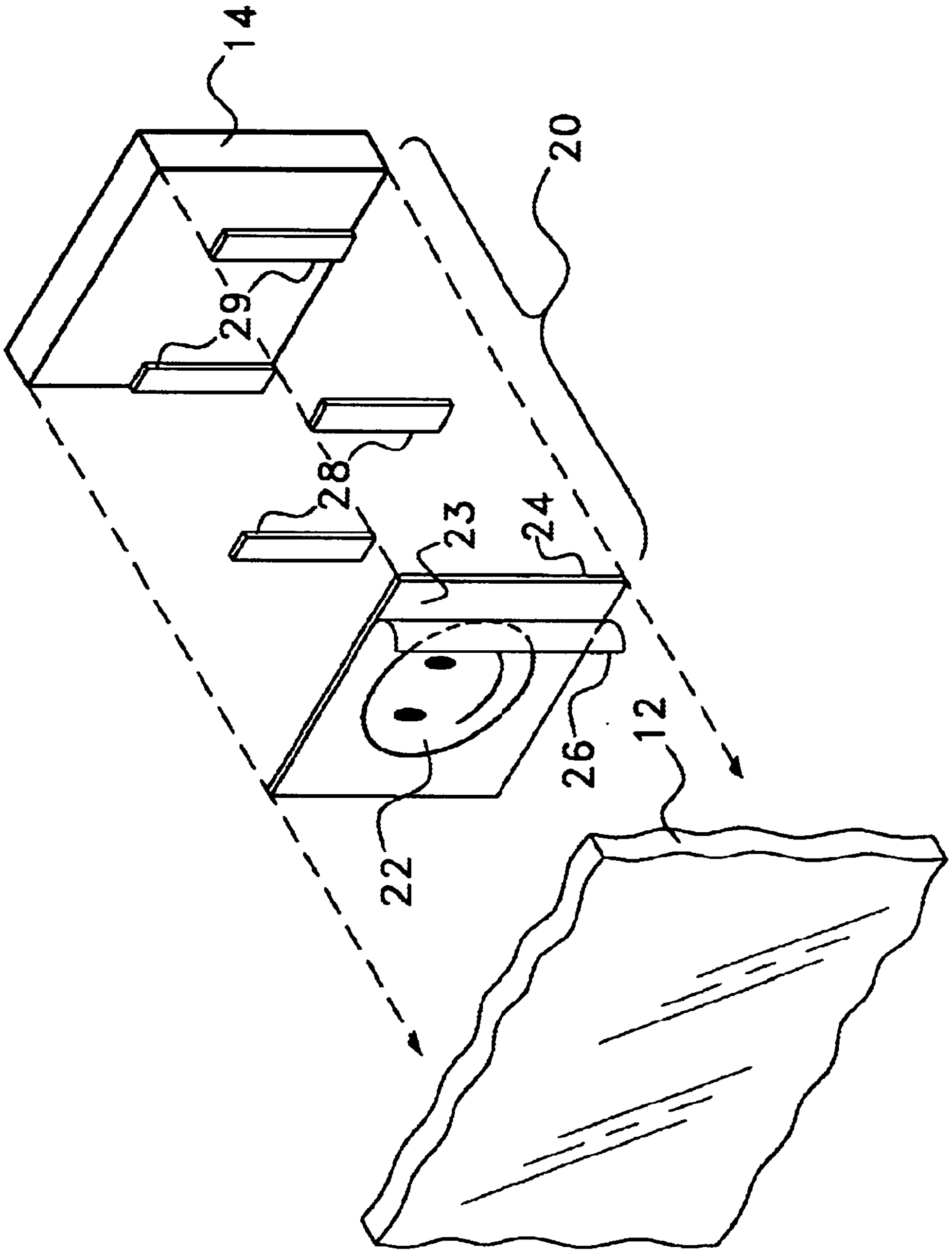
FIG. 2 is an exploded perspective view of a first exemplary embodiment of the present invention mounting device, shown with a section of windshield and an electronic toll payment pass.

Referring to FIG. 2, an embodiment of the present invention mounting system 20 is shown having a set display image 22. The display image 22 is printed on the face surface 23 of a support substrate 24. The support substrate 24 is preferably a paperboard product. However, plastic substrates, such as vinyl, can also be used. After the display image 22 is printed on the support substrate 24, the support substrate 24 can optionally be laminated on one or both sides to provide better strength and durability to the support substrate 24.

A clear adhesive is applied to the face surface 23 of the support substrate 24 atop the display image 22. The adhesive is covered with a removable protective cover 26 that prevents the adhesive from drying. The protective cover 26 is removed to expose the adhesive and enable the support substrate 24 to be adhesively attached to the inside of the vehicle's windshield 12.

A first set of hook and loop strips 28 are provided. The first set of hook and loop strips 28 attach to the back surface of the support substrate 24 that faces in toward the interior of the vehicle. The first set of hook and loop strips 28 can come preattached to the back surface of the support substrate 24 or can come unattached for attachment by the installer. It will be understood that if the first set of hook and loop strips 28 are provided unattached to the support substrate 24, the hook and loop strips 28 will have adhesively coated surfaces that enable them to be selectively applied to the support substrate 24.

A second set of hook and loop fasteners 29 are provided. The second set of hook and loop fasteners 29 are adhesively attached to the housing of the electronic toll payment device 14 in positions that correspond to the positions of the first set of hook and loop strips 28 on the support substrate 24.

With the second set of hook and loop fasteners 29 attached to the housing of the electronic toll payment pass 14, the electronic toll payment pass 14 can be selectively detached and reattached to the first set of hook and loop strips 28 on the back surface of the support substrate 24. The area of the support substrate 24 is at least as large as the area of the abutment surface of the electronic toll payment pass 14. Accordingly, once the electronic toll payment pass 14 is attached to the support substrate 24, the bottom of the electronic payment pass 14 cannot be seen from a person viewing the front of the vehicle's windshield 12.

The support substrate 24 is only a thin opaque sheet of paperboard or plastic. As such, the presence of the support substrate 24 between the windshield 12 and the housing of the electronic toll payment pass 14 has a negligible effect upon the functionality of the electronic toll payment pass 14.

Figure 3:
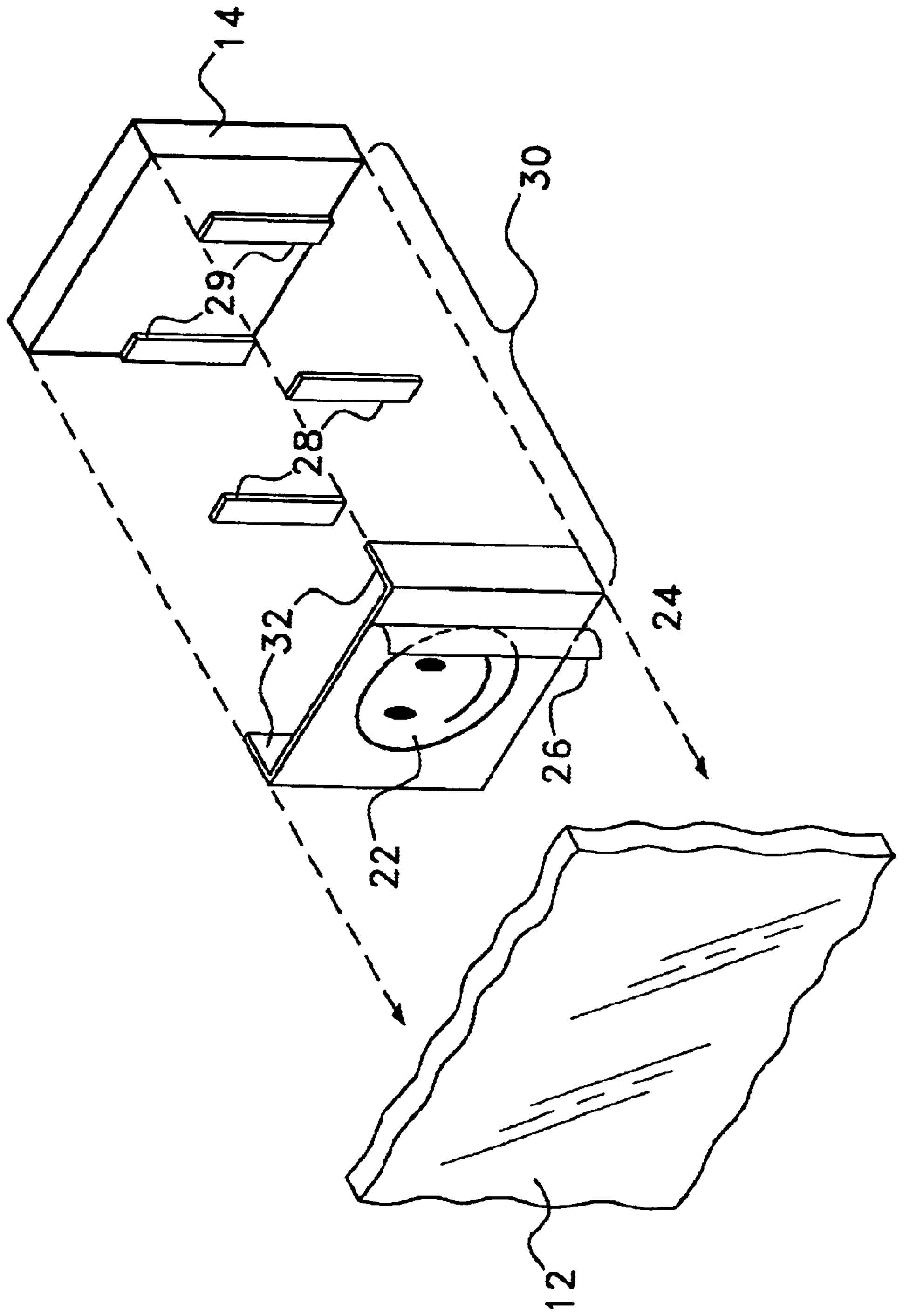
FIG. 3 is an exploded perspective view of a second exemplary embodiment of the present invention mounting device, shown with a section of windshield and an elect toll payment pass.

Referring to FIG. 3, a slightly different version of the mounting device 30 is shown. The embodiment shares many of the same features as does the embodiment of FIG. 2, accordingly, the same reference numerals are used to identify the same parts.

In the embodiment of FIG. 3, two side walls 32 extend backward from the back surface of the support substrate 24. The distance between the side walls 32 is at least as large as the length of the housing of the electronic toll payment pass 14. Accordingly, when the electronic toll payment pass 14 is attached to the support substrate 24 with the two sets of hook and loop strips 28, 29, the side walls 32 extend over the sides of the housing of the electronic toll payment pass 14. Consequently, even when a person is looking through the windshield 12 of the vehicle from a side angle, the housing of the electronic toll payment pass 14 cannot be seen.

Figure 4:
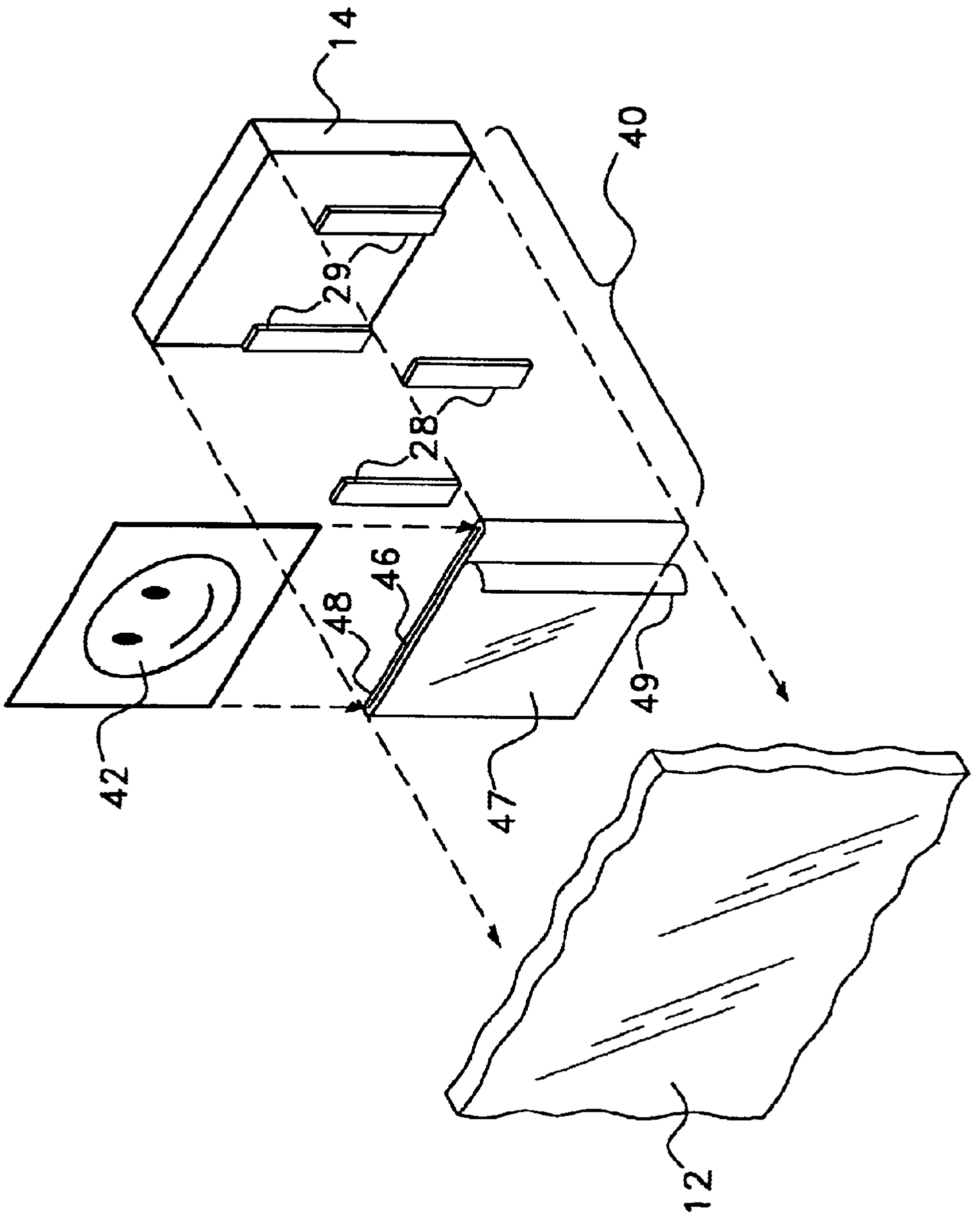
FIG. 4 is an exploded perspective view of a third exemplary embodiment of the present invention mounting device, shown with a section of windshield and an electronic toll payment pass.

Referring to FIG. 4, a third embodiment of the present invention mounting device 40 is shown. In this embodiment, a display image 42 is printed on a removable insert 44. The shown embodiment includes a pocket structure 46. The pocket structure 46 has a front surface 47 and a back surface 48, wherein a pocket is defined between the front surface 47 and the back surface 48. The front surface 47 of the pocket structure 46 is transparent. The back surface 48 of the pocket structure 46 can be either transparent or opaque. The front surface 47 and back surface 48 of the pocket structure 46 can be manufactured to be either rigid or flexible.

The front surface 47 of the pocket structure 46 is not joined to the back surface 48 of the pocket structure 46 along at least one side edge. Accordingly, an insert 44 with a printed display image 42 can be added into the pocket structure 46 along this edge. In the shown embodiment, the open edge is the top edge. However, it should be understood that either the side edges or the bottom edge can be open in alternate embodiments.

The insert 44 with the display image 42 can be a photograph, drawing or any other image printed onto paper. The insert 44 can be selectively changed by simply removing the insert 44 from the pocket structure 46 and replacing it with another.

A clear adhesive is applied to the exterior of the front surface 47. The adhesive is covered with a removable protective cover 49 that prevents the adhesive from drying. The protective cover 49 is removed to expose the adhesive and enable the exterior of the front surface 47 to be adhesively attached to the inside of the vehicle's windshield.

A first set of hook and loop strips 28 are provided. The first set of hook and loop strips 28 attach to the exterior of the back surface 48. A second set of hook and loop strips 29 are provided. The second set of hook and loop strips 29 are adhesively attached to the housing of the electronic toll payment pass 14 in positions that correspond to the positions of the first set of hook and loop strips 28 on the back surface 48.

With the second set of hook and loop fasteners 48 attached to the housing of the electronic toll payment pass 14, the electronic toll payment pass 14 can be selectively detached and reattached to the first set of hook and loop strips 29 on the back surface 48 of the pocket structure 46. The pocket area within the pocket structure 46 is at least as large as the area of the abutment surface of the electronic toll payment pass 14. Accordingly, once the electronic toll payment pass 14 is attached to the back surface 48 of the pocket structure 46, the insert 44 in the pocket structure 46 obscures the electronic toll payment pass 14 from being seen by a person viewing the front of the vehicle's windshield.

The pocket structure 46 is only made from thin pieces of plastic with a paper insert 44 in the pocket. Such a thin structure between the windshield 12 and the housing of the electronic toll payment pass 14 has a negligible effect upon the functionality of the electronic toll payment pass at a tollbooth.

Figure 5:
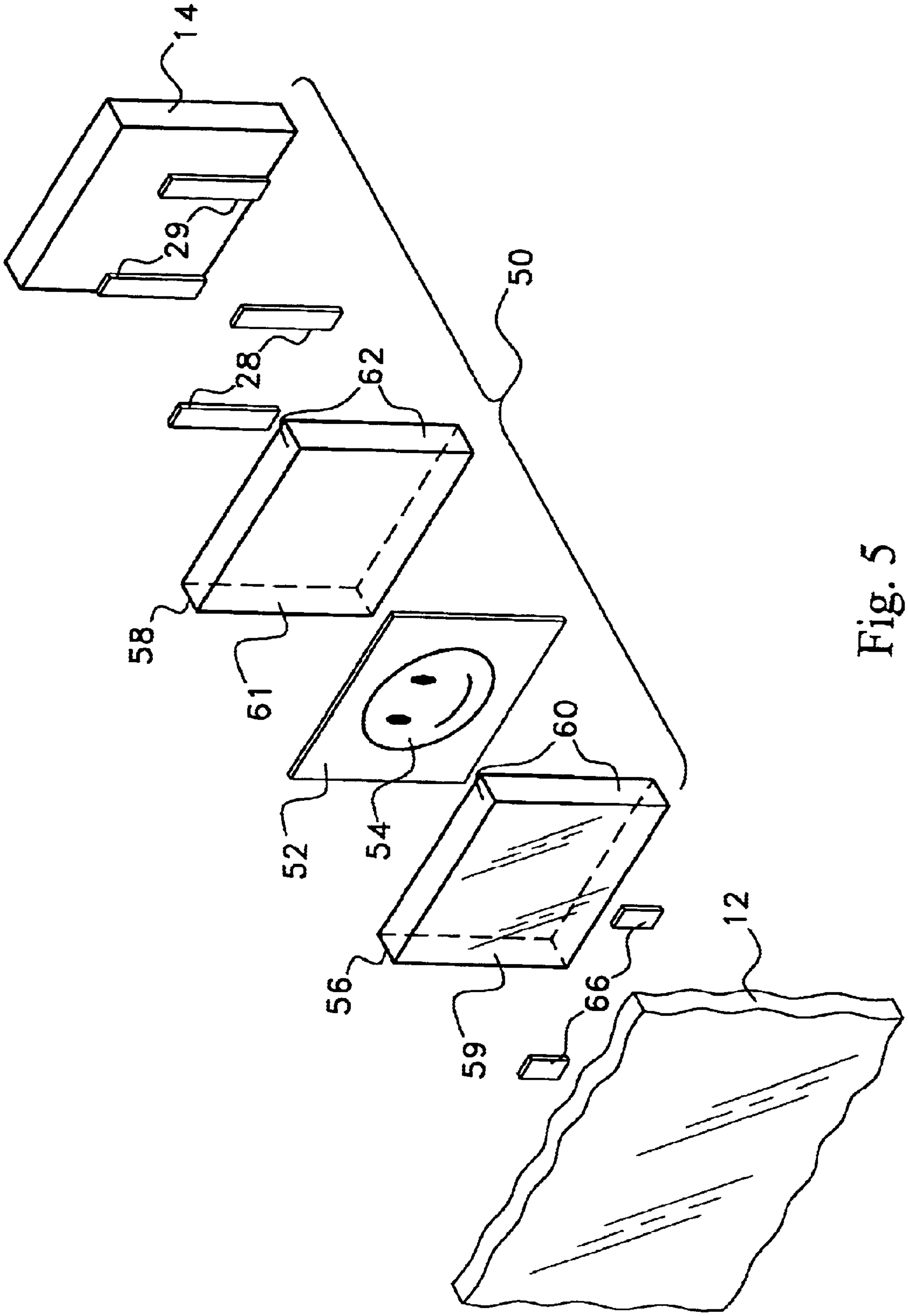
FIG. 5 is an exploded perspective view of a fourth exemplary embodiment of the present invention mounting device, shown with a section of windshield and an electronic toll payment pass.

Referring now to FIG. 5, a fourth embodiment of the present invention mounting system 50 is shown. In this embodiment, a replaceable insert 52 with a display image 54 is also provided. In the shown embodiment, two nesting elements 56, 58 are provided. The outer nesting element 56 is comprised of a transparent front surface 59 and four walls 60 that extend from the periphery of the front surface 59. The four walls 60 are connected at the corners creating an undisrupted peripheral wall.

The inner nesting element 58 is sized to fit snugly within the confines of the outer nesting element 56. The inner nesting element 58 is also comprised of a front surface 61 and four walls 62 that extend from the periphery of the front surface 61. The four walls 62 are connected at the corners creating an undisrupted peripheral wall.

An insert 52 with a display image 54 is placed in between the inner nesting element 58 and the outer nesting element 56. The display image 54 is held in place by the seating of the inner nesting element 56 within the confines of the outer nesting element 58. The display image is visible through the transparent front surface 59 of the outer nesting element 56.

The face of the front surface of the outer nesting element 56 can be coated with an adhesive. However, in the shown embodiment, segments of double-sided tape 66 are used to illustrate that there is more than one way to adhere the present invention to the glass of a windshield.

The walls 62 of the inner nesting element 58 define an area that corresponds to the size of the housing of the electronic toll payment pass 14. Accordingly, when the electronic toll payment pass 14 is mounted within the inner nesting element 58 with the two sets of hook and loop strips 28, 29, the side walls of both the inner nesting element 58 and outer nesting element 56 extend over the sides of the housing of the electronic toll payment pass 14. Consequently, even when a person is looking through the windshield of the vehicle from a side angle, the housing of the electronic toll payment pass 14 cannot be seen.

It will be understood that all of the embodiments of the present invention illustrated and described are merely exemplary and that the present invention can be practiced in a variety of different ways other than what is shown. For example, the shape and size of the housing of the electronic toll payment pass may vary depending upon the manufacturer. Certainly in years to come, the size of electronic toll payment passes will decrease. Consequently, it will be understood that the present invention mounting device can be varied in shape and size to match the configuration of the electronic toll payment pass. All such modifications and alternate embodiments are intended to be covered by the scope of the claims presented below.

What is claimed is:

1. A device for mounting an electronic toll payment pass to a windshield of a vehicle, said device comprising:

a mounting structure having a back surface and a transparent face surface, wherein a pocket is defined between said back surface and said face surface;

a removable insert disposed in said pocket, said removable insert having a display image thereon that is viewable in said pocket through said face surface of said mounting structure;

an adhesive fastener for attaching said face surface of said mounting structure to the windshield of the vehicle;

a mounting fastener coupled to said back surface of said mounting structure that enables the electronic toll payment pass to be selectively mounted to said back surface of said mounting structure, wherein said display image on said removable insert is observable through the windshield and said transparent face surface of said mounting structure and said removable insert prevents the electronic toll payment pass from being observed through the windshield from a position in front of said face surface of said mounting structure.

2. The device according to claim 1, wherein walls extend from said back surface of said mounting structure, wherein the electronic toll payment pass is disposed between said walls when mounted to said back surface of said mounting structure.

3. The device according to claim 1, wherein said mounting fastener includes at least one area of hook and loop fastening material.

4. A method of mounting an electronic toll payment pass to a windshield of a vehicle, comprising the steps of:

providing a mounting structure having a back surface and a transparent face surface, wherein a pocket is defined between said back surface and said face surface;

providing a removable insert having a display image printed thereon;

placing said removable insert into said pocket wherein said display image is viewable through said face surface of said mounting structure;

attaching the face surface of the mounting structure to the windshield of the vehicle, wherein said display image is visible through the windshield and the face surface of the mounting structure;

attaching the electronic toll payment pass to the back surface of the mounting structure, wherein said mounting structure is interposed between the windshield and the electronic toll payment pass and said display image prevents the electronic toll payment pass from being observed through the windshield.

* * * * *